(12) United States Patent
Zhu (10) Patent No.: US 12,179,579 B2
(45) Date of Patent: Dec. 31, 2024

(54) GRID-SHAPED FUEL TANK

(71) Applicant: Tongya (Shandong) Automobile Technology Group Co., Ltd., Jinan (CN)

(72) Inventor: Qingkai Zhu, Jinan (CN)

(73) Assignee: Tongya (Shandong) Automobile Technology Group Co., Ltd., Jinan (CN)

( * ) Notice: Subject to any disclaimer, the term of this patent is extended or adjusted under 35 U.S.C. 154(b) by 18 days.

(21) Appl. No.: 17/759,810

(22) PCT Filed: Aug. 6, 2021

(86) PCT No.: PCT/CN2021/111082
§ 371 (c)(1),
(2) Date: Jul. 29, 2022

(87) PCT Pub. No.: WO2023/272877
PCT Pub. Date: Jan. 5, 2023

(65) Prior Publication Data
US 2024/0181869 A1 Jun. 6, 2024

(30) Foreign Application Priority Data
Jun. 30, 2021 (CN) .......................... 202110738457.2

(51) Int. Cl.
*B60K 15/077* (2006.01)
*B60K 15/04* (2006.01)
(52) U.S. Cl.
CPC ............ *B60K 15/077* (2013.01); *B60K 15/04* (2013.01); *B60K 2015/0775* (2013.01)
(58) Field of Classification Search
CPC ................. B60K 15/077; B60K 15/04; B60K 2015/0775; B60K 2015/0777
(Continued)

(56) References Cited

U.S. PATENT DOCUMENTS 3,680,275 A * 8/1972 Romlet ...................... E04H 7/18
220/555
5,398,839 A * 3/1995 Kleyn .............. B60K 15/03177
220/555
(Continued)

FOREIGN PATENT DOCUMENTS

CN 204279054 U 4/2015
CN 204674375 U 9/2015
(Continued)

OTHER PUBLICATIONS

EP21916640.2—Extended European Search Report mailed on Aug. 3, 2023, 8 pages.
(Continued)

*Primary Examiner* — J. Gregory Pickett
*Assistant Examiner* — Niki M Eloshway
(74) *Attorney, Agent, or Firm* — Getech Law LLC; Jun Ye (57) ABSTRACT

Disclosed is a grid-shaped fuel tank, which belongs to the field of vehicle parts. The grid-shaped fuel tank includes a fuel tank shell, wherein the fuel tank shell encloses a cavity comprising a fuel cavity, and the fuel tank shell comprises an upper shell area in an upper portion, a middle shell area in a middle portion and a lower shell area in a lower portion; the cavity is internally provided with a middle grid rib structure corresponding to a height area of a middle shell, the middle grid rib structure partitions a middle portion of the cavity into a plurality of middle grid cavities, the middle grid cavities do not communicate in a radial direction, and a bottom end of a first middle grid cavity group comprised in the middle grid cavities is provided with fuel passing ports for mutual communication to form the fuel cavity.

12 Claims, 6 Drawing Sheets

(58) Field of Classification Search
USPC ........................................................ 220/564
See application file for complete search history.

(56) References Cited

U.S. PATENT DOCUMENTS

| | | | | |
|---|---|---|---|---|
| 8,074,819 B2 * | 12/2011 | Dexter | .................. | F01P 11/029 |
| | | | | 220/678 |
| 8,844,754 B2 * | 9/2014 | Pozgainer | ........ | B60K 15/03177 |
| | | | | 220/563 |
| 2002/0066737 A1 * | 6/2002 | Stack | ................... | B60K 15/077 |
| | | | | 220/564 |
| 2008/0035649 A1 | 2/2008 | Ohlsson et al. | | |

FOREIGN PATENT DOCUMENTS

| | | |
|---|---|---|
| CN | 206086362 U | 4/2017 |
| CN | 109910594 A | 6/2019 |
| CN | 110329060 A | 10/2019 |
| CN | 110525201 A | 12/2019 |
| CN | 209795183 U | 12/2019 |
| CN | 210212036 U | 3/2020 |
| CN | 113246718 A | 8/2021 |
| DE | 102011101720 A1 | 9/2012 |
| DE | 102016104873 A1 * | 9/2016 ............. B60K 15/03 |
| EP | 1238845 A2 * | 9/2002 ............. B29C 49/20 |
| JP | H05169989 A | 7/1993 |
| JP | 2003175733 A | 6/2003 |
| WO | WO-2014147013 A1 * | 9/2014 ......... B29C 45/1676 |
| WO | WO-2017197464 A1 * | 11/2017 ........... B60K 15/077 |

OTHER PUBLICATIONS

JP2022547716—Notice of Reasons for Refusal mailed on Sep. 26, 2023, 12 pages.

* cited by examiner

GRID-SHAPED FUEL TANK

CROSS REFERENCE TO RELATED APPLICATIONS

This application is a 371 of International Application No. PCT/CN21/111082 filed Aug. 6, 2021, which claims priority to Chinese Patent Application No. 202110738457.2, filed Jun. 30, 2021. The contents of each of the above-captioned patent applications are hereby expressly incorporated herein by reference in their entireties.

TECHNICAL FIELD

The present application relates to a grid-shaped fuel tank, and belongs to the field of vehicle parts.

BACKGROUND

With the rapid development of the vehicle industry and the improvement of environmental protection requirements on vehicles, the structural optimization and performance improvement of fuel tanks serving as important safety regulatory parts in vehicle parts have become the problems that major vehicle manufacturers are competing to discuss and solve.

During the driving process of a vehicle, fuel inside a fuel tank will surge forward or backward due to shaking when road is bumpy or when the vehicle starts and stops or turns, which will impact a fuel tank body, resulting in deformation of the fuel tank or cracking of welding parts of the fuel tank to cause fuel leakage, affecting the driving safety; in addition, the surge of the fuel will also lead to the shift of the gravity center of the whole vehicle, which will directly affect the driving safety, and even cause fuel overflow; and the surge of fuel hits an inner wall of the fuel tank to produce a certain amount of noise, which seriously reduces the user's driving experience.

At present, in order to reduce the impact of the fuel inside the fuel tank, a diaphragm is set inside the fuel tank. In the prior art, the diaphragm is usually welded with the wall of the fuel tank, and a hole is formed in the middle for the fuel, however, this welding structure easily concentrates a stress on a welded joint between the diaphragm and the tank body. During the travel of the vehicle body, the surge of the fuel will lead to the cracking of the welding position between the diaphragm and the tank body, and the surge prevention is not ideal.

SUMMARY

In order to solve the above problems, the present application provides a grid-shaped fuel tank. The grid-shaped fuel tank partitions a middle portion of a cavity into a plurality of middle grid cavities, so that side walls of each middle grid cavity jointly share the impact caused by the flow of fuel, therefore, there is no need to design an anti-surge diaphragm separately, and the surge phenomenon of the fuel can be significantly reduced; in addition, middle grid ribs can increase the overall rigidity of the fuel tank and prevent the deformation or cracking of a tank body when the tank body is impacted by external forces; and moreover, a fuel cavity is formed by forming fuel passing ports in a bottom end of a first middle grid cavity group to communicate with each other to make the fuel flow in a lower shell area, which greatly reduces the impact caused by the flow of the fuel and weakens the "surge" phenomenon of the fuel.

One aspect of the present application provides a grid-shaped fuel tank, the grid-shaped fuel tank includes: a fuel tank shell, the fuel tank shell encloses a cavity including a fuel cavity, and the fuel tank shell includes an upper shell area at an upper portion, a middle shell area at a middle portion and a lower shell area at a lower portion; and
the cavity is internally provided with a middle grid rib structure corresponding to a height area of a middle shell, the middle grid rib structure partitions a middle portion of the cavity into a plurality of middle grid cavities, the middle grid cavities do not communicate in a radial direction, and a bottom end of a first middle grid cavity group included in the middle grid cavities is provided with fuel passing ports for mutual communication to form the fuel cavity.

Optionally, an inlet is formed in a top end of at least one of first middle grid cavities in the first middle grid cavity group, the inlet is connected with a fuel inlet formed in the fuel tank shell, and openings are formed in bottom ends of the first middle grid cavities to communicate with each other to form the fuel cavity; and
the middle grid rib structure is of a grid shape formed by the arrangement and connection of a plurality of middle diaphragms, and the first middle grid cavity group is of a sealed channel structure with openings in two ends.

Optionally, the cavity is internally further provided with a lower grid rib structure corresponding to the lower shell area, and the lower grid rib structure is aligned with the middle grid rib structure to be in sealed connection;
the lower grid rib structure partitions a lower portion of the cavity into a plurality of lower grid cavities, the lower grid cavities include a first lower grid cavity group aligned with the first middle grid cavity group, and the first middle grid cavities in the first middle grid cavity group communicate with first lower grid cavities in the first lower grid cavity group through the fuel passing ports; and
fuel flow ports formed in lower grid ribs between the first lower grid cavities are in communication, and the first middle grid cavity group and the first lower grid cavity group form the fuel cavity.

Optionally, the lower shell area includes side walls and a bottom wall, and the fuel flow ports extend upward from the connection between the lower grid ribs and the bottom wall.

Optionally, a cross section of the middle grid cavity is in a shape selected from at least one of a triangle, a quadrangle, a circle, a pentagon, a hexagon and a polygon.

Optionally, the fuel tank is a cube, the middle grid ribs include a plurality of middle diaphragms extending along an axial direction of the fuel tank, and the cross section of the middle grid cavity is a right-angled quadrangle.

Optionally, the fuel tank shell is integrally formed by blow molding/rotational molding, or is formed by welding.

Another aspect of the present application provides an integrated fuel tank, the integrated fuel tank includes the above any one of the grid-shaped fuel tank, the middle grid cavities further include a second middle grid cavity group, the first middle grid cavity group and the second middle grid cavity group do not communicate with each other, and middle grid cavities in the second middle grid cavity group communicate with each other to form a urea cavity.

Optionally, bottom ends of the second middle grid cavities in the second middle grid cavity group are sealed, and side walls of the second middle grid cavities communicate with each other to form the urea cavity.

Optionally, the second middle grid cavities are integrally formed by injection molding.

The beneficial effects of the present application include but are not limited to:

1. According to the grid-shaped fuel tank provided by the present application, the middle portion of the cavity is divided the plurality of middle grid cavities by setting the middle grid rib structure, the middle grid cavities do not communicate in the radial direction, each middle grid cavity is internally filled with the fuel, so that the side walls of each middle grid cavity jointly share the impact caused by the flow of the fuel, therefore, there is no need to design an anti-surge diaphragm separately, and the surge phenomenon of the fuel can be significantly reduced; in addition, the middle grid ribs can increase the overall rigidity of the fuel tank and prevent the deformation or cracking of the tank body when the tank body is impacted by the external forces; in addition, since an area with the highest impact frequency and the largest impact is mainly concentrated in the middle portion of the fuel tank during driving, the fuel cavity is formed by forming the fuel passing ports in the bottom end of the first middle grid cavity group to communicate with each other to make the fuel flow in the lower shell area, which greatly reduces the impact caused by the flow of the fuel and weakens the "surge" phenomenon of the fuel.
2. According to the grid-shaped fuel tank provided by the present application, by forming the inlet at the top end of at least one of the first middle grid cavities in the first middle grid cavity group, the inlet is connected with the fuel inlet formed in the fuel tank shell, and the bottom ends of the first middle grid cavities are provided with the openings, so that after the fuel enters at least one of the first middle grid cavities through the fuel inlet, the fuel flows into other first middle grid cavities through the openings in the bottom ends of the first middle grid cavities, so as to achieve the same fuel level in each first middle grid cavity, that is, the side wall of each first middle grid cavity bears uniform fuel impact, so as to further prevent the fuel tank from the deformation or cracking caused by uneven stress.
3. The grid-shaped fuel tank provided by the present application, by arranging the lower grid rib structure in the lower shell area, the fuel impact on the shell corresponding to the lower shell area of the fuel tank is further reduced, and the strength of the shell corresponding to the lower shell area of the fuel tank is improved to prevent a deformation phenomenon; by communicating the fuel flow ports formed in the lower grid ribs between the first lower grid cavities to make the fuel flow in the lower shell area, not only can the flow of the fuel between each first lower grid cavity be achieved so as to achieve the flow of the fuel in each first middle grid cavity, but also the fuel impact on the middle diaphragms can be reduced and fuel tank is prevented from deformation or cracking the due to excessive impact.
4. According to the grid-shaped fuel tank provided by the present application, by setting the shape of the cross section of the middle grid cavity to be a right angle quadrangle, the structural stability of the middle grid cavity is further improved, the strength of the fuel tank is increased, and the deformation phenomenon of the fuel tank is prevented.
5. According to the integrated fuel tank provided by the present application, the second middle grid cavity group is arranged, and the second middle grid cavity group do not communicate with the first middle grid cavity group, so that the integrated arrangement of the fuel cavity and the urea cavity is realized, which reduces the volume of the integrated fuel tank, reduces the integrated weight of the fuel cavity and the urea cavity, and makes the vehicle lighter; and in addition, by arranging the fuel cavity and urea cavity integrally, the heat of the fuel tank can heat the urea cavity, realizing the reuse of heat and avoiding the crystallization of urea liquid in the urea cavity.
6. According to the integrated fuel tank provided by the present application, the bottom ends of the second middle grid cavities in the second middle grid cavity group are sealed, so that the first middle grid cavity group and the second middle grid cavity group do not communicate with each other, and the fuel can flow and communicate under the second middle grid cavity group to reduce the flow resistance of the fuel.

BRIEF DESCRIPTION OF THE DRAWINGS

The drawings described herein are used to provide a further understanding of the present application and constitute a part of the present application. Schematic embodiments and description thereof are used for explaining the present application and do not limit the present application improperly. In the drawings:

FIG. 16 is a sectional view of a grid-shaped fuel tank in an E-E direction according to an embodiment 3 of the present application in;

LIST OF PARTS AND REFERENCE NUMERALS 11, upper shell; 12, fuel inlet; 13, upper grid rib; 14, fuel-gas through hole; 15, urea feeding port; 31, middle shell; 32, middle grid rib; 33, first middle grid cavity; 34, second middle grid cavity; 35, sinking cavity; 36, annular boss; 37, urea flow port; 51, lower shell; 52, lower grid rib; 53, fuel flow port; 54, first lower grid cavity; 55, second lower grid cavity; 56, fuel sewage drain bolt; 57, urea sewage drain bolt; 58, urea sensor.

DETAILED DESCRIPTION OF THE PREFERRED EMBODIMENTS

To explain the overall conception of the present application more clearly, detailed description will be made below in conjunction with the drawings by way of examples.

In order to more clearly understand the above objectives, features and advantages of the present application, the present application will be further described in detail in conjunction with the drawings and the specific embodiments. It should be noted that the embodiments of the present application and the features in the embodiments may be combined with each other under the condition of no conflict.

In the following description, many specific details are set forth in order to facilitate full understanding of the present application, but the present application may also be implemented in other ways other than those described herein. Therefore, the protection scope of the present application is not limited by the specific embodiments disclosed below.

In addition, in the description of the present application, it should be understood that the terms "center", "upper", "lower", "front", "rear", "left", "right", "vertical", "horizontal", "top", "bottom", "inner", "outer", "axial", "radial", "circumferential" indicate the orientation or position relationship based on the orientation or position relationship shown in the drawings, are only for facilitating description of the present application and simplifying the description, rather than indicating or implying that the device or element referred to must have a specific orientation, be constructed and operated in a specific orientation, and thus shall not be construed as a limitation to the present application.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include one or more of the features. In the description of the present application, "a plurality of" means two or more, unless otherwise expressly and specifically defined.

In the present application, unless otherwise specified and defined, the terms "installation", "connected", "connection", "fixation" and other terms shall be understood in a broad sense, for example, connection may be fixed connection, detachable connection or integrated connection; connection may be mechanical connection, electrical connection or communication; connection may be direct connection or indirect connection through an intermediate medium; connection may be internal communication of two elements or the interaction relationship between two elements. For those skilled in the art, the specific meaning of the above terms in the present application can be understood according to the specific circumstances.

In the present application, unless otherwise expressly specified and defined, a first feature is "above" or "below" a second feature may be that the first feature is in direct contact with the second feature, or the first feature is in indirect contact with the second feature through an intermediate medium. In the description of this description, the description referring to the terms "one embodiment", "some embodiments", "examples", "specific examples", or "some examples" or the like means that the specific features, structures, materials or features described in connection with the embodiments or examples are included in at least one embodiment or example of the present application. In this description, the schematic expression of the above terms does not have to be for the same embodiments or examples. Further, the specific features, structures, materials or features described may be combined in any one or more embodiments or examples in a suitable manner.

A grid-shaped fuel tank of the present application may only serve as a fuel tank, and may also serve as an integrated fuel tank and urea tank, or an integration of a fuel tank and other functional cavities. The grid-shaped fuel tank may be used as, but is not limited to, a fuel storage part of a motor vehicle. An integrated fuel tank and urea tank is taken as an example in the drawings in the following embodiments to describe a structure of a grid-shaped fuel tank, but the grid-shaped fuel tank is not limited thereto.

Figure 1:
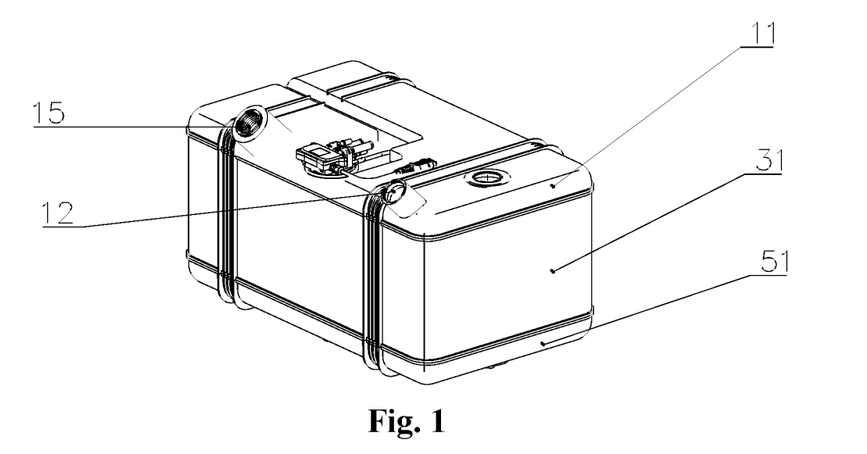
FIG. 1 is a three-dimensional schematic diagram of a grid-shaped fuel tank according to embodiments 1 and 2 of the present application.
Figure 2:
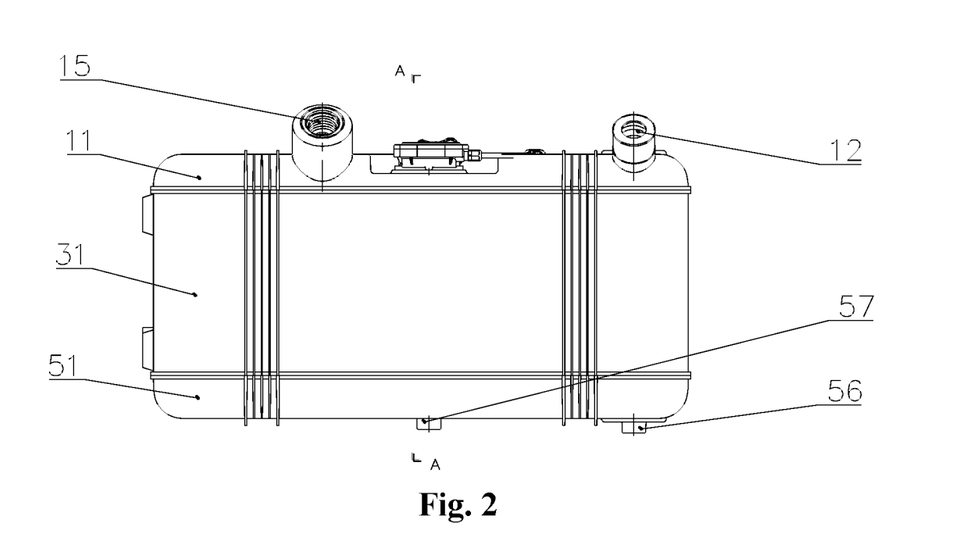
FIG. 2 is a front view of a grid-shaped fuel tank according to embodiments 1 and 2 of the present application.
Figure 3:
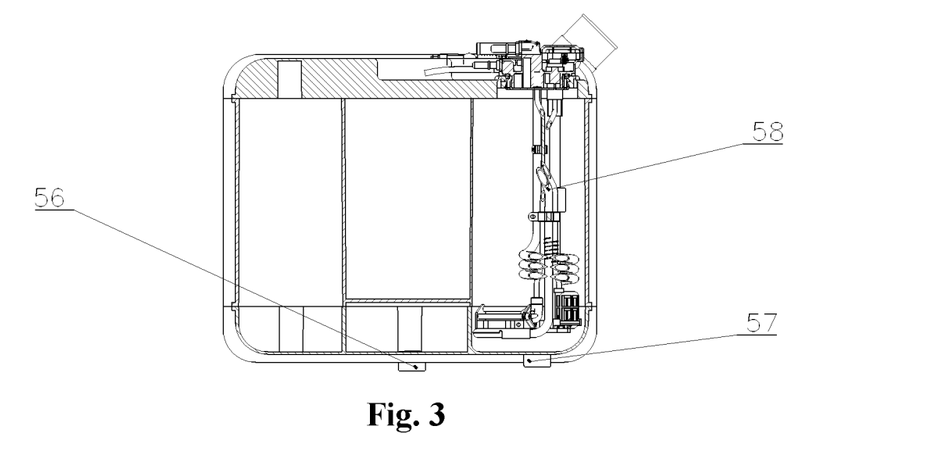
FIG. 3 is a sectional view of a grid-shaped fuel tank in an A-A direction according to embodiments 1 and 2 of the present application.
Figure 4:
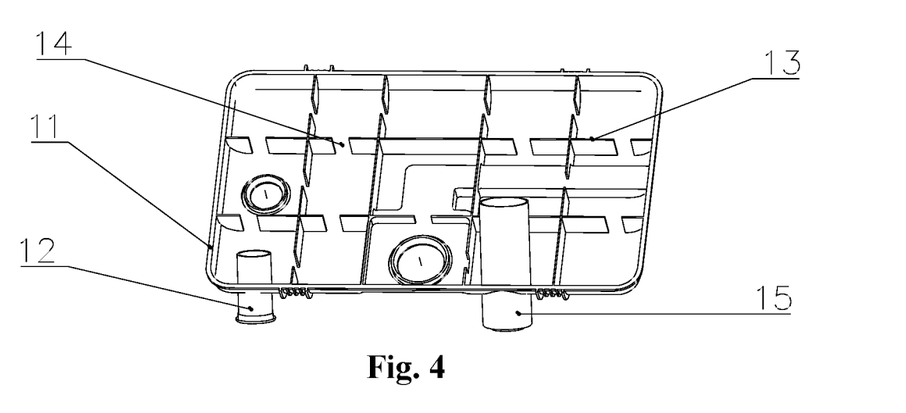
FIG. 4 is a schematic diagram of an upper shell of a grid-shaped fuel tank according to embodiments 1 and 2 of the present application.
Figure 5:
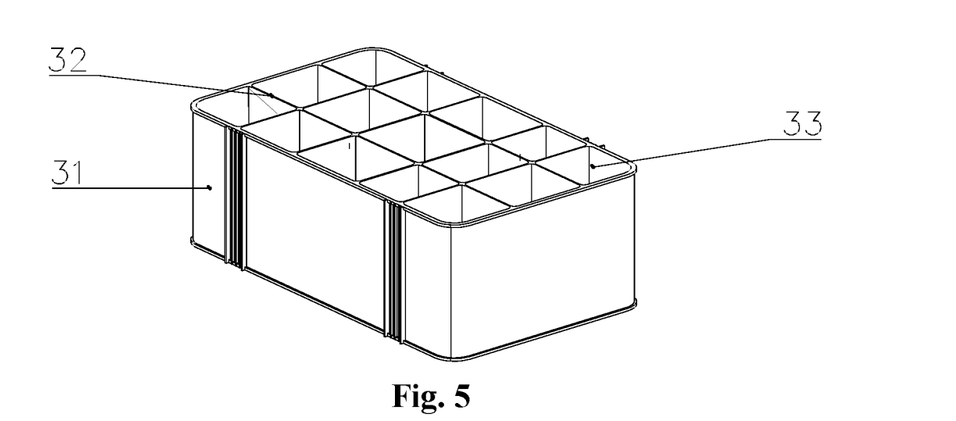
FIG. 5 is a schematic diagram of a middle shell of a grid-shaped fuel tank according to embodiments 1 and 2 of the present application.
Figure 6:
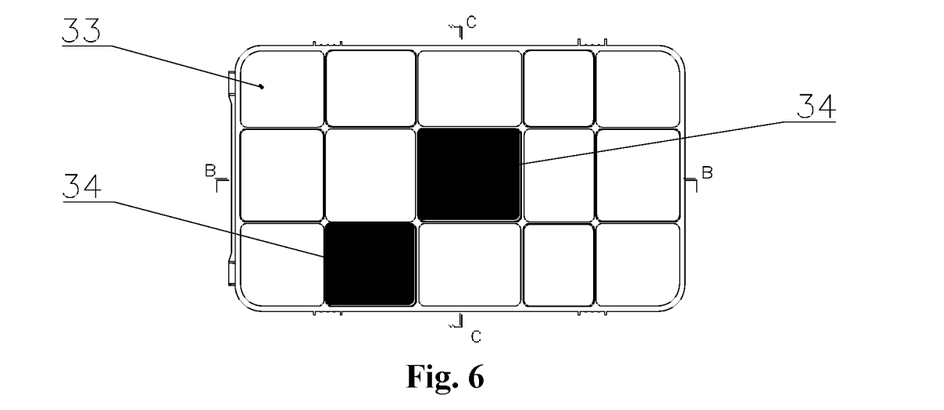
FIG. 6 is a top view of a middle shell of a grid-shaped fuel tank according to embodiments 1 and 2 of the present application.
Figure 7:
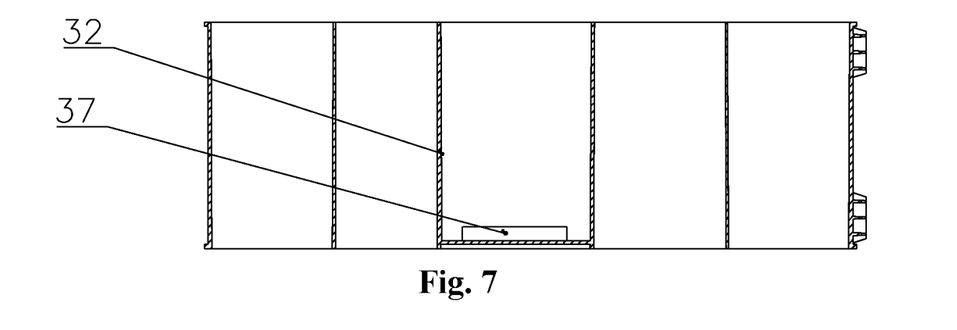
FIG. 7 is a sectional view of a grid-shaped fuel tank in a B-B direction according to embodiments 1 and 2 of the present application.
Figure 8:
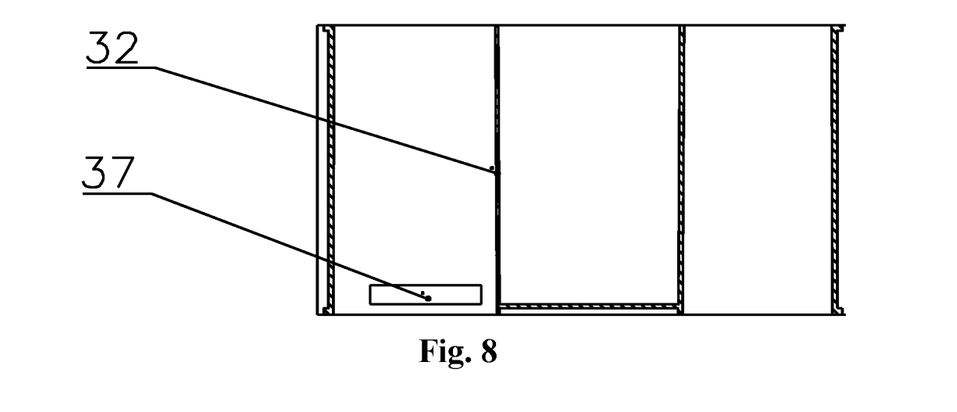
FIG. 8 is a sectional view of a grid-shaped fuel tank in a C-C direction according to embodiments 1 and 2 of the present application.
Figure 9:
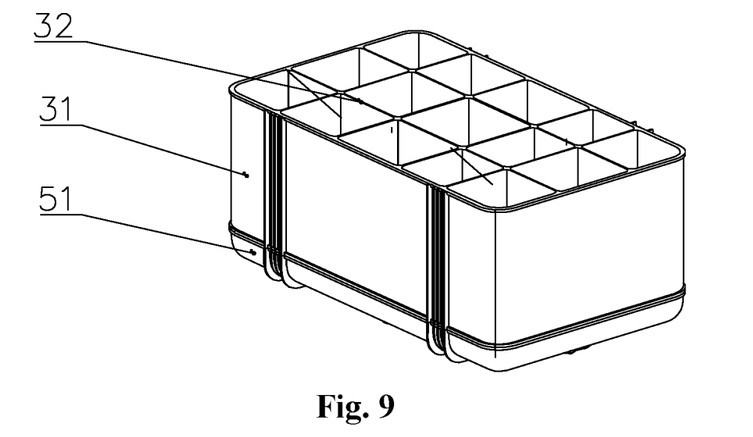
FIG. 9 is a schematic diagram of a lower shell and a middle shell of a grid-shaped fuel tank being combined according to embodiments 1 and 2 of the present application.
Figure 10:
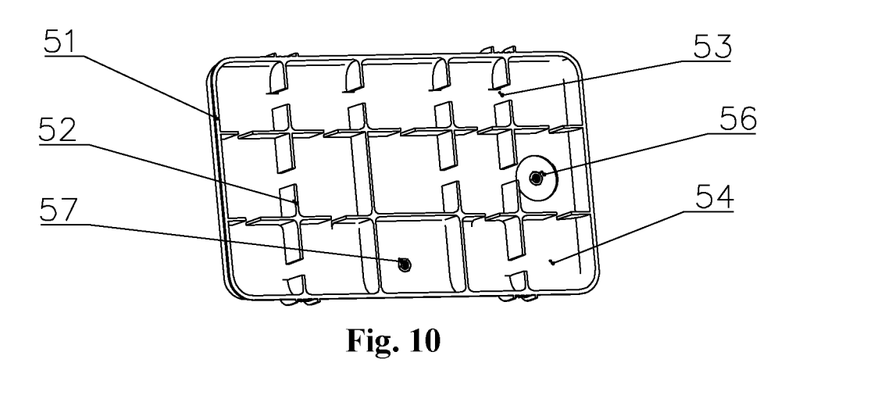
FIG. 10 is a schematic diagram of an upper shell of a grid-shaped fuel tank according to embodiments 1 and 2 of the present application.
Figure 11:
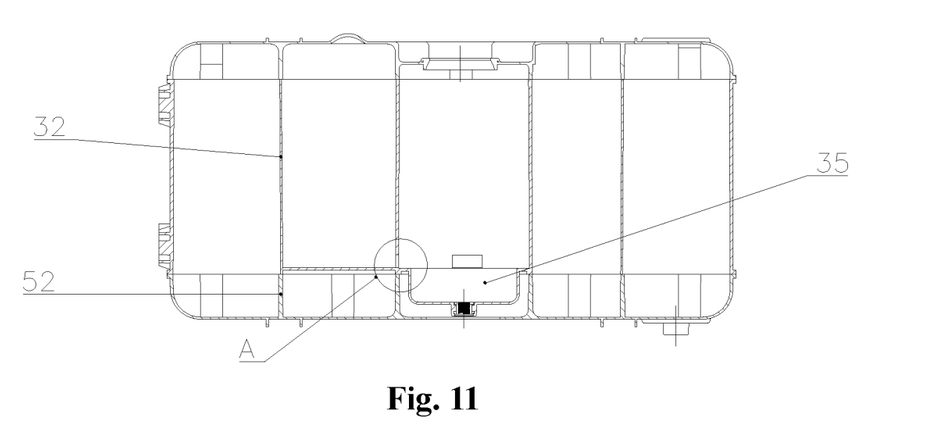
FIG. 11 is a front sectional diagram of a grid-shaped fuel tank according to an embodiment 3 of the present application.
Figure 12:
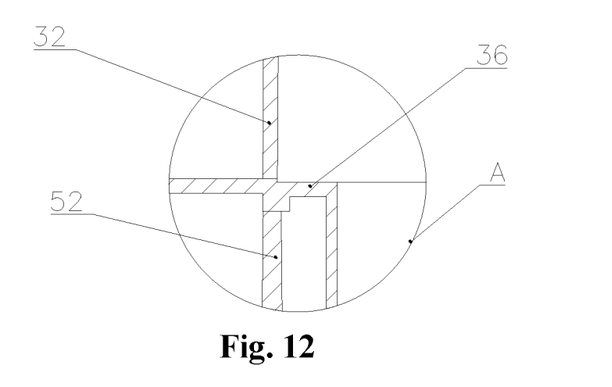
FIG. 12 is an enlarged diagram of a part A in FIG. 11.
Figure 13:
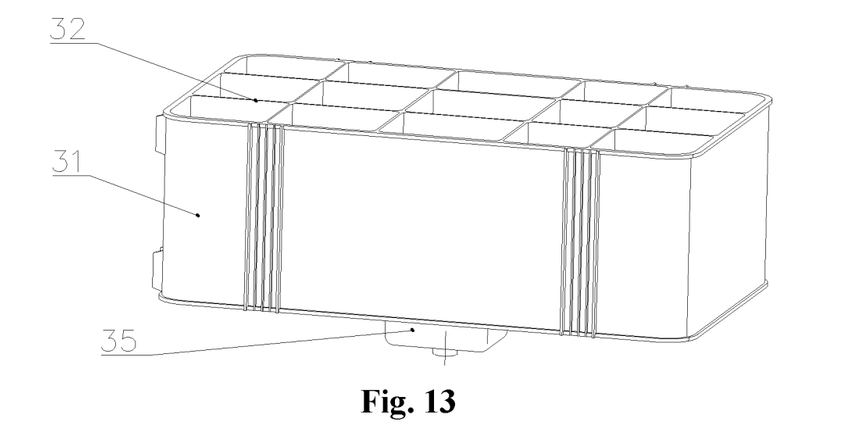
FIG. 13 is a schematic diagram of a middle shell of a grid-shaped fuel tank according to an embodiment 3 of the present application.
Figure 14:
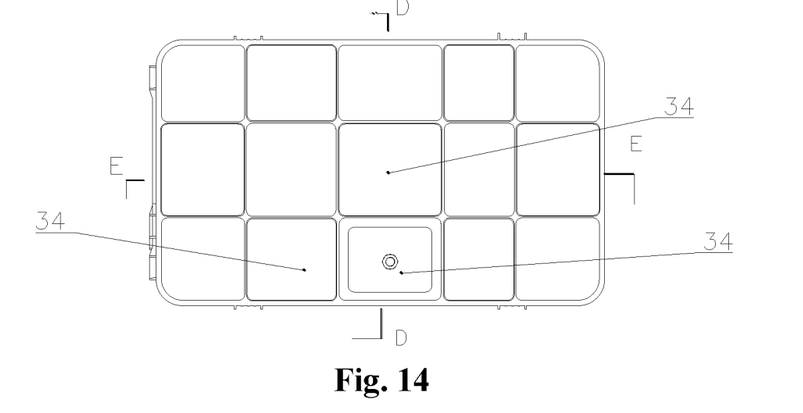
FIG. 14 is a top view of a middle shell of a grid-shaped fuel tank according to an embodiment 3 of the present application.
Figure 15:
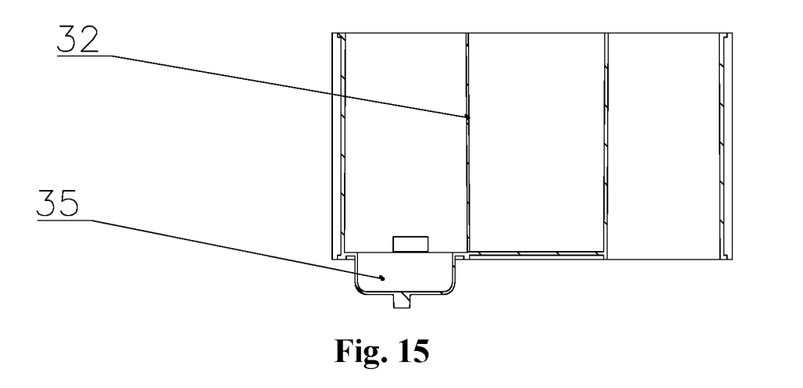
FIG. 15 is a sectional view of a grid-shaped fuel tank in a D-D direction according to an embodiment 3 of the present application.
Figure 16:
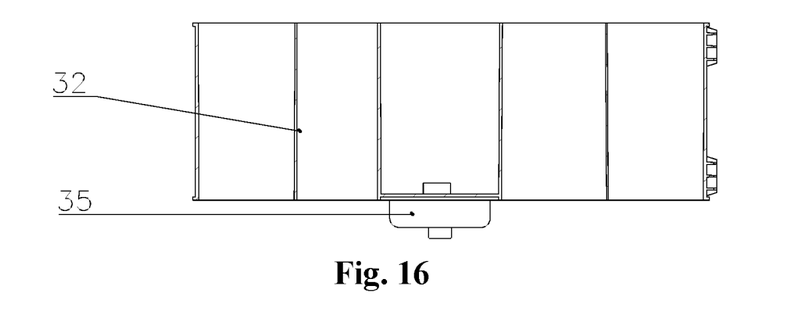

As an embodiment, referring to FIG. 1, an integrated fuel tank and urea tank, that is, a grid-shaped fuel tank includes a fuel tank shell, wherein the fuel tank shell is internally provided with a urea cavity and a fuel cavity, the fuel tank shell is provided with a urea feeding port 15 and a fuel inlet 12, the grid-shaped fuel tank further includes a urea sensor 58 and a urea pump communicating with the urea cavity, and a fuel level sensor and a fuel pump communicating with the fuel cavity. Fuel is not limited to gasoline, diesel, etc.

Embodiment 1

As shown in FIGS. 1-10, the embodiment 1 of the present application discloses a grid-shaped fuel tank, including: a fuel tank shell, wherein the fuel tank shell encloses a cavity including a fuel cavity, and the fuel tank shell includes an upper shell area at an upper portion, a middle shell area at a middle portion and a lower shell area at a lower portion; the cavity is internally provided with a middle grid rib 32 structure corresponding to a height area of a middle shell 31, the middle grid rib 32 structure partitions a middle portion of the cavity into a plurality of middle grid cavities, the middle grid cavities do not communicate in a radial direction, and a bottom end of a first middle grid cavity group included in the middle grid cavities is provided with fuel passing ports for mutual communication to form the fuel cavity. The middle portion of the cavity is divided into the plurality of middle grid cavities by arranging the middle grid rib 32 structure, the middle grid cavities do not communicate in the radial direction, each of first middle grid cavities 33 in the first middle grid cavity group is filled with fuel, so that side walls of each middle grid cavity jointly share the impact caused by flow of the fuel, therefore, there is no need to design an anti-surge diaphragm separately, and a surge phenomenon of the fuel can be significantly reduced; in addition, middle grid ribs 32 can increase the overall rigidity of the fuel tank and prevent a tank body from a deformation or cracking phenomenon when the tank body is impacted by external forces; and in addition, since an area with the highest impact frequency and the largest impact is mainly concentrated at the middle portion of the fuel tank during driving, the fuel cavity is formed by forming fuel passing ports in the bottom end of the first middle grid cavity group for mutual communication to make the fuel flow in the lower shell area, which greatly reduces the impact caused by flow of the fuel and weakens the "surge" phenomenon of the fuel.

Specifically, a height ratio of the upper shell area to the middle shell area to the lower shell area is (0.8-1.2):(4-6):(0.8-1.2). Preferably, the height ratio of the upper shell area to the middle shell area to the lower shell area is 1:5:1. This setting mode can ensure the smooth flow of the fuel in the lower shell area, further reduce the impact of the fuel, greatly reduce the impact on the fuel tank, and extend the service life of the fuel tank.

Specifically, the fuel tank shell can be processed by any processing method, for example, the fuel tank shell can be integrally formed by blow molding, or can also be formed by welding a plurality of shells after injection molding respectively. It can be understood that the fuel tank shell processed by any processing method includes the upper shell area at the upper portion, the middle shell area at the middle portion and the lower shell area at the lower portion. Specifically, in order to further improve the strength of the first middle grid cavity group and improve the wall thickness uniformity of the middle grid rib 32 structure, the first middle grid cavity group is integrally formed by injection molding.

As an embodiment, the fuel tank shell includes an upper shell 11, a middle shell 31 and a lower shell 51. The upper shell 11, the middle shell 31 and the lower shell 51 are welded respectively to form a cavity including a fuel cavity. The fuel tank shell is welded after injection molding, which not only has uniform wall thickness and high mechanical strength, but also disperses a welding stress at upper and lower ends of the shell by welding the upper shell 11, the middle shell 31 and the lower shell 51 respectively. Therefore, on the one hand, the stress concentrated at the welding portion of the shell is reduced to avoid the cracking phenomenon of the welding portion; and on the other hand, since a middle area of the shell bears the greatest flow impact of liquid such as shaking fuel, a welded joint is avoided being disposed at the middle area of the shell, which not only improves the overall strength of the shell, but also avoids the cracking of the welding portion of the shell due to the impact, and prolongs the service life of the fuel tank.

Specifically, the upper shell 11 forms the upper shell area, the middle shell 31 forms the middle shell area, and the lower shell 51 forms the lower shell area.

As an embodiment, a height of the middle shell 31 accounts for more than ⅓ of a total height of the shell. By setting the height of the middle shell 31 to account for more than ⅓ of the total height of the shell, a welded joint between the middle shell 31 and the upper shell 11 and a welded joint between the middle shell 31 and the lower shell 51 are arranged at upper and lower ends of the shell, so that the welded joints are far away from the area where the shell is subjected to the maximum impact, so as to disperse the welding stress to the upper and lower ends of the shell and avoid the cracking phenomenon caused by the stress concentration at the welded joint.

Preferably, a height ratio of the upper shell 11 to the middle shell 31 to the lower shell 51 is (0.8-1.2):(4-6):(0.8-1.2); more preferably, the height ratio of the upper shell 11 to the middle shell 31 to the lower shell 51 is 1:5:1, and heights of the upper shell and the lower shell are both 50-80 mm. By setting the height ratio of the upper shell 11 to the middle shell 31 to the lower shell 51, the amount of product deformation due to the injection molding characteristics is conveniently controlled. In addition, since the stress of the shell is mainly concentrated at the middle shell 31, the height of the middle shell 31 needs to be controlled to be moderate, to ensure that the stress is dispersed to various areas of the shell, improve the overall strength of the shell, and prolong the service life of the fuel tank.

As an embodiment, the upper shell 11, the middle shell 31 and the lower shell 51 are separately subjected to injection molding and then welded by hot melting. By performing injection molding on the upper shell 11, the middle shell 31 and the lower shell 51 separately, the wall thickness uniformity of the upper shell 11, the middle shell 31 and the lower shell 51 is improved separately, the mechanical strength is improved, and the service life of the fuel tank is further prolonged.

As an embodiment, a thickness of the upper shell 11 and a thickness of the lower shell 51 are both greater than a thickness of the middle shell 31, so that a width of a welding surface of the upper shell 11 and a width of a welding surface of the lower shell 51 are both greater than a width of a welding surface of the middle shell 31. By setting the thickness of the upper shell 11 to be greater than the thickness of the middle shell 31, the width of the welding surface of the upper shell 11 is greater than the width of the welding surface of the middle shell 31, so that a welding area between the upper shell 11 and the middle shell 31 can be increased, the welding surface of the middle shell 31 and the welding surface of the upper shell 11 can be completely welded together, and the phenomenon of missing welding between the middle shell 31 and the upper shell 11 can be prevented. In addition, the thickening of the upper shell 11 can also improve the bearing capacity of the upper shell 11, and prevent the upper shell 11 from deformation due to carrying electrical components; by setting the thickness of the lower shell 51 to be greater than the thickness of the middle shell 31, the width of the welding surface of the lower shell 51 is greater than the width of the welding surface of the middle shell 31, so that a welding area between the lower shell 51 and the middle shell 31 is increased and the welding strength between the lower shell 51 and the middle shell 31 is improved. In addition, the lower shell 51 is located at the bottom of the shell, so that the thickening of the bottom of the lower shell 51 can improve the bearing capacity of the lower shell 51 and prevent the deformation of the lower shell 51; the thickness of the middle shell 31 is set to be less than the thickness of the upper shell 11 and the thickness of the lower shell 51, so that the weight of the shell can be reduced and the vehicle is lighter.

Specifically, the thickness of the upper shell 11 is the same as the thickness of the lower shell 51, and the thickness of the middle shell 31 is a target thickness of the shell. This setting mode is conducive to improving the integrity of the shell.

Preferably, the thickness of the middle shell 31 is not more than 4 mm, and the thickness of the upper shell 11 and the thickness of the lower shell 51 are both not less than 5 mm; preferably, the thickness of the middle shell 31 is 4 mm, and the thickness of the upper shell 11 and the thickness of the lower shell 51 are both 5 mm. By setting the thicknesses of the upper shell 11, the middle shell 31 and the lower shell 51, the welding area between the middle shell 31 and the upper shell 11 or the welding area between the middle shell 31 and the lower shell 51 can be increased, the welding strength of the shell can be improved, the welded joint can be prevented from cracking due to suffering from the impact, and at the same time, the shell can be prevented from being too heavy and the vehicle can be lighter.

As an embodiment, at least one of a lower-end welding surface of the upper shell 11 and an upper-end welding surface of the middle shell 31 corresponding to the lower-end welding surface of the upper shell 11 before welding is provided with a welding material boss ring to widen the formed welding surface by hot melting. By arranging the welding material boss ring on the at least one of the lower-end welding surface of the upper shell 11 and/or the upper-end welding surface of the middle shell 31 before welding, the welding material boss ring is heated to be melted during welding, so as to widen the formed welding surface, so that the upper-end welding surface of the middle shell 31 forms an outward flanged structure, and the welding strength between the upper shell 11 and the middle shell 31 is further improved.

As an embodiment, at least one of an upper-end welding surface of the lower shell 51 and a lower-end welding surface of the middle shell 31 corresponding to the upper-end welding surface of the lower shell 51 before welding is provided with a welding material boss ring to widen the formed welding surface. By arranging the welding material boss ring on the upper-end welding surface of the lower shell 51 and/or the lower-end welding surface of the middle shell 31 before welding, the welding material boss ring is heated to be melted during welding, so as to widen the formed welding surface, so that the lower-end welding surface of the middle shell 31 forms an outward flanged structure, and the welding strength between the lower shell 51 and the middle shell 31 is further improved.

Specifically, the lower-end welding surface of the upper shell 11, the upper-end welding surface of the middle shell 31, the lower-end welding surface of the middle shell 31 and the upper-end welding surface of the lower shell 51 before welding are each provided with a welding boss ring, and each welding boss ring includes a plurality of welding bosses.

As an embodiment, a top end of at least one of the first middle grid cavities 33 in the first middle grid cavity group is provided with an inlet, the inlet is connected with the fuel inlet 12 formed in the fuel tank shell, and the bottom ends of the first middle grid cavities 33 are provided with openings for mutual communication to form the fuel cavity; the middle grid rib 32 structure is formed by the arrangement and connection of a plurality of middle diaphragms to form a grid shape, and the first middle grid cavity group is of a sealed channel structure with openings in two ends. By setting that the inlet is formed in the top end of at least one of the first middle grid cavities 33, the inlet is connected with the fuel inlet 12 formed in the fuel tank shell, and the bottom ends of the first middle grid cavities 33 are provided with the openings, so that after the fuel enters at least one of the first middle grid cavity 33 through the fuel inlet 12, the fuel flows into other first middle grid cavities 33 through the openings in the bottom ends of the first middle grid cavities 33, and thus, fuel levels in all the first middle grid cavities 33 are the same, that is, the fuel impact borne by the side walls of each first middle grid cavity 33 is uniform, so as to further prevent the fuel tank from deformation or cracking caused by uneven stress.

Specifically, the top end of each first middle grid cavity 33 is provided with an inlet, one of the inlets is connected with the fuel inlet 12 formed in the fuel tank shell. By forming the inlet in the top end of each first middle grid cavity 33, the top ends of the first middle grid cavities 33 communicate, so as to realize the circulation of the fuel at the upper portions of the first middle grid cavities 33. In addition, a flow channel is provided for a fuel-gas phase generated by the fuel.

Specifically, the fuel inlet 12 is provided with a one-way valve.

As an embodiment, the cavity is further provided with a lower grid rib 52 structure corresponding to the lower shell area, the lower grid rib 52 structure is aligned with the middle grid rib 32 structure to be in sealed connection; the lower grid rib 52 structure partitions a lower portion of the cavity into a plurality of lower grid cavities, the lower grid cavities include a first lower grid cavity 54 group aligned with the first middle grid cavity group, the first middle grid cavities 33 in the first middle grid cavity group communicate with first lower grid cavities 54 in the first lower grid cavity 54 group through the fuel passing ports; fuel flow ports 53 formed in lower grid ribs 52 between the first lower grid cavities 54 communicate, and the fuel cavity is formed by the first middle grid cavity group and the first lower grid cavity 54 group. By setting the lower grid rib 52 structure in the lower shell area, the fuel impact on the lower shell area of the fuel tank is further reduced, and the strength of the lower shell area of the fuel tank is improved to prevent the lower shell from deformation; by enabling the fuel flow ports 53 formed in the lower grid rib 52 between the first lower grid cavities 54 to be communication and making the fuel flow in the lower shell area, not only can the flow of the fuel between the first lower grid cavities 54 be achieved so as to achieve the flow of the fuel in each first middle grid cavity 33, but also the fuel impact on the middle diaphragms can be reduced and the fuel tank is prevented from deformation or cracking due to excessive impact.

Preferably, the lower shell 51 and the lower grid ribs 52 are subjected to injection molding at one time. The lower shell 51 and the lower grid rib 52 are subjected to injection molding at one time, so that it can be ensured that thicknesses of the lower grid ribs 52 are uniform, the connection strength between the lower shell 51 and the lower grid ribs 52 can be improved, and the mechanical strength of the tank body can be improved.

As an embodiment, the lower shell area includes side walls and a bottom wall, and the fuel flow ports 53 extend upward from the connection between the lower grid ribs 52 and the bottom wall. This setting mode can ensure the smooth flow of the fuel from the fuel flow ports 53.

Specifically, the lower grid rib 52 structure is formed by arrangement and connection of a plurality of lower diaphragms to form a grid shape. One end of the first lower grid cavity 54 is open to communicate with the first middle grid cavity 33, and the other end of the first lower grid cavity 54 is connected with the bottom wall of the lower shell area.

Specifically, the lower shell 51 below one of the first middle grid cavities 33 is provided with a boss which is provided with a fuel sewage drain bolt 56 as a fuel sewage drain port.

Specifically, the upper shell 11 above one of the first middle grid cavities 33 is provided with a boss for installing a fuel sensor.

Specifically, this embodiment does not limit the shape of the fuel flow port 53, for example, the shape may be a circle, a triangle, a quadrangle, a polygon, etc., wherein the polygon may be a pentagon, a hexagon, a heptagon, an octagon, etc., as long as the flow of fuel can be realized. The fuel flow port 53 in this embodiment is rectangular.

As an embodiment, a cross section of each middle grid cavity is in a shape selected from at least one of a circle, a triangle, a quadrilateral and a polygon. The polygon may be a pentagon, a hexagon, a heptagon, an octagon, etc. Specifically, the fuel tank is a cube, the middle grid ribs 32 include a plurality of middle diaphragms extending in an axial direction of the fuel tank, and the cross section of each middle grid cavity is a right-angled quadrangle. By setting the cross section of each middle grid cavity to be of the right-angle quadrangle, the structural stability of each middle grid cavity is further improved, the strength of the fuel tank is increased, and the deformation phenomenon of the fuel tank is prevented.

Specifically, the middle grid cavities formed by the first middle grid cavity group and the second middle grid cavity group are of a matrix structure, the number of rows and the number of columns of the matrix structure are odd, and two midlines of a urea tank and fuel tank assembly pass through the interiors of the first middle grid cavities 33 or the second middle grid cavities 34, so as to avoid that the stress in the middle is concentrated at the middle grid ribs 32 and further disperse the stress; and the number of rows and the number of columns of the matrix structure are odd, which is conducive to uniform demolding, the warping deformation of each middle grid cavity is uniform, and the forming accuracy of the product is improved.

Preferably, the matrix structure is a 3×5 matrix or a 5×7 matrix.

Specifically, this embodiment does not limit the area of the fuel flow port 53, as long as the flow of the fuel can be realized. Further, a height of the fuel flow port 53 is the same as that of the lower shell area, and a ratio of a width of the fuel flow port 53 to a side length of the first lower grid cavity 54 is (0.25-0.35):1, preferably the ratio is 0.3:1. More preferably, the width of the fuel flow port is 30 mm. This setting mode can reduce the flow resistance of the fuel and prevent the deformation phenomenon of the lower diaphragm due to excessive resistance; and at the same time, this setting mode can ensure that there is a large enough welding area between the lower grid rib 52 and the lower shell 51 to improve the welding strength.

As an embodiment, the fuel tank shell is integrally formed by blow molding/rotational molding, or is formed by welding. Preferably, the fuel tank shell is formed by the upper shell 11, the middle shell 31 and the lower shell 51 which are respectively subjected to injection molding and then welding by hot melting.

As an embodiment, the upper shell area is internally provided with upper grid ribs 13 aligned with the middle grid ribs 32, the upper grid ribs 13 and the middle grid ribs 32 are welded, and a thickness of each upper grid rib 13 and a thickness of each lower grid rib 52 are greater than a thickness of each middle grid rib 32. By arranging the upper grid ribs 13 in the upper shell 11, the fuel impact on the upper shell 11 of the fuel tank is reduced, and the strength of the upper shell 11 of the fuel tank is improved, and the deformation phenomenon of the upper shell is prevented; by setting that the thickness of each upper grid rib 13 and the thickness of each lower grid rib 52 are greater than the thickness of each middle grid rib 32, a width of a welding surface of each upper grid rib 13 and a width of a welding surface of each lower grid rib 52 are greater than a width of a welding surface of each middle grid rib 32, so as to increase the welding area between the upper shell 11 and the middle shell 31, and the welding area between the lower shell 51 and the middle shell 31, and improve the welding strength between the upper shell 11 and the middle shell 31, and the welding strength between the lower shell 51 and the middle shell 31, in addition, the bearing capacity of the lower grid ribs 52 and the lower shell 51 can be improved, the support force of the lower grid ribs 52 for the lower shell 51 and the support force of the upper grid ribs 13 for the upper shell 11 are increased, and the deformation of the lower shell 51 and the upper shell 11 is further prevented; and in addition, by setting that the thickness of each middle grid rib 32 is less than the thickness of each upper grid rib 13 and the thickness of each lower grid rib 52, the weight of the shell can be reduced and the shell is lighter.

Specifically, the thickness of each middle grid rib 32 is not more than 4 mm, and the thickness of each upper grid rib 13 and the thickness of each lower grid rib 52 are not less than 5 mm; and more preferably, the thickness of each middle grid rib 32 is 4 mm, and the thickness of each upper grid rib 13 and the thickness of each lower grid rib 52 are both 5 mm.

As an embodiment, the upper shell 11 includes side walls and a top wall, each upper grid rib 13 is provided with a fuel-gas through hole 14 which extends downward from the connection between the upper grid rib 13 and the top wall. By setting the fuel-gas through hole 14, it can be ensured that an upper channel is provided for the fuel and a channel is provided for the flow of the fuel and gas.

Specifically, the upper shell 11 and the upper grid ribs 13 are subjected to injection molding at one time. The upper shell 11 and the upper grid ribs 13 are subjected to injection molding at one time, so that it can be ensured that the thickness of each upper grid rib 13 is uniform, the connection strength between the upper shell 11 and the upper grid ribs 13 can be improved, and the mechanical strength of the tank body can be improved.

As an embodiment, a lower-end welding surface of each middle grid rib 32 and/or an upper-end welding surface of each lower grid rib 52 before welding are/is provided with a welding material boss ring to widen the formed welding surface by hot melting. By setting the welding material boss ring on the lower-end welding surface of each middle grid rib 32 and/or the upper-end welding surface of each lower grid rib 52 before welding, the welding material boss ring is heated to be melted during welding, so as to widen the formed welding surface, and further improve the welding strength between each middle grid rib 32 and each lower grid rib 52.

As an embodiment, before welding, an upper-end welding surface of each middle grid rib 32 and/or a lower-end welding surface of each upper grid rib 13 arc/is provided with a welding material boss ring to widen the formed welding surface by hot melting. By setting the welding material boss ring on the upper-end welding surface of each middle grid rib 32 and/or the lower-end welding surface of each upper grid rib 13 before welding, the welding material boss ring is heated to be melted during welding, so as to widen the formed welding surface, and to further improve the welding strength between each middle grid rib 32 and each upper grid rib 13.

Embodiment 2

As shown in FIGS. 1-10, the embodiment 2 of the present application provides an integrated fuel tank, which includes the grid-shaped fuel tank in the embodiment 1, the middle grid cavities further include a second middle grid cavity group, the first middle grid cavity group and the second middle grid cavity group do not communicate with each other, and middle grid cavities in the second middle grid cavity group communicate with each other to form a urea cavity. The second middle grid cavity group is arranged, and the second middle grid cavity group does not communicate with the first middle grid cavity group, so that the integrated arrangement of the fuel cavity and the urea cavity is realized, which reduces the volume of the integrated fuel tank, reduces the integrated weight of the fuel cavity and the urea cavity, and makes the vehicle lighter; and in addition, by arranging the fuel cavity and urea cavity integrally, the heat of the fuel cavity can heat the urea cavity, realizing the reuse of the heat and avoiding the crystallization of urea liquid in the urea cavity.

Specifically, each middle grid rib 32 in the second middle grid cavity group is provided with a urea flow port 37 so that the urea liquid in the second middle grid cavities 34 communicates with each other. Specifically, this embodiment does not limit the shape of the urea flow port 37, for example, the shape may be a circle, a triangle, a quadrangle, a polygon, etc., wherein the polygon may be a pentagon, a hexagon, a heptagon, an octagon, etc., as long as the circulation of urea can be realized, and the urea flow port 37 in the embodiment is rectangular.

Specifically, this embodiment does not limit the position of the urea flow port 37, for example, the urea flow port 37 may be formed in a lower or middle portion of each middle grid rib 32 in the second middle grid cavity group, preferably the lower portion.

Specifically, this embodiment does not limit the arrangement mode of the first middle grid cavity group and the second middle grid cavity group, as long as the first middle grid cavity group and the second middle grid cavity group do not communicate each other. Preferably, the second middle grid cavities 34 in the second middle grid cavity group are symmetrically arranged. Preferably, the second middle grid cavities 34 are arranged diagonally to ensure uniform gravity distribution and further prevent the deformation phenomenon of the tank body due to uneven stress, and this setting mode is convenient for processing and the wall thickness is uniform.

Specifically, a top end of at least one of the second middle grid cavity 34 in the second middle grid cavity group is provided with an inlet, and the inlet communicates with the urea feeding port 15 formed in the fuel tank shell, so as to supplement urea into the urea cavity.

Specifically, the urea feeding port 15 is provided with a one-way valve.

As an embodiment, bottom ends of the second middle grid cavities 34 in the second middle grid cavity group are sealed, and side walls of the second middle grid cavities 34 communicate with each other to form the urea cavity. The bottom ends of the second middle grid cavities 34 in the second middle grid cavity group are sealed, so that the first middle grid cavity group and the second middle grid cavity group do not communicate with each other, and the fuel can flow and communicate under the second middle grid cavity group to reduce the flow resistance of the fuel.

As an embodiment, a connecting surface between the bottom wall of each of the second middle grid cavities 34 and the middle shell 31 and/or a connecting surface between the bottom wall of each of the second middle grid cavities 34 and each of the middle grid ribs 32 are/is higher than the welding surface at the lower end of the middle shell 31 and/or the welding surface at the lower end of each of the middle grid ribs 32. The bottom walls of the second middle grid cavities 34 and the middle grid ribs 32 are subjected to injection molding integrally. This setting mode can prevent the mutual seepage of the urea liquid and the fuel, prevent the fuel from seeping into the urea cavity through the welded joint to avoid contaminating the urea liquid, and prevent the urea liquid from seeping into the fuel cavity to avoid damaging an engine.

As an embodiment, the second middle grid cavities 34 are integrally formed by injection molding. The second middle grid cavities 34 are integrally formed by injection molding to ensure uniform wall thickness of the middle grid ribs 32 of the second middle grid cavities 34 and improve the strength of the second middle grid cavities 34.

Specifically, the upper shell 11 is provided with a groove for installing the urea sensor 58 so that a top end of the urea sensor 58 does not exceed a top end of the groove, which is conducive to protecting the urea sensor 58 and increasing the volume of the tank body.

Embodiment 3

As shown in FIGS. 11-16, the difference between the embodiment 3 and the embodiment 2 is that, the bottom wall of one of the second middle grid cavities 34 sinks into the lower grid cavity to form a sinking cavity 35, the sinking cavity 35 and the second middle grid cavity 34 above the sinking cavity 35 are used to install the urea sensor 58, a bottom wall of the sinking cavity 35 is provided with a urea sewage drain port, and the urea sewage drain port is provided with a urea sewage drain bolt 57. The sinking cavity 35 sinks into the lower grid cavity, so that not only can the required installation height be reserved for the urea sensor 58, but also the volume of the urea cavity can be increased to reserve a certain level of urea liquid in the sinking cavity 35, so as to ensure that a urea filter element is immersed in the urea liquid and prevent the urea from crystallizing at the urea filter element to avoid blocking the urea filter element.

Specifically, side walls of the sinking cavity 35 may be the lower grid ribs 52, or may be integrally formed with the middle grid ribs 32 by injection molding. A bottom wall of the sinking cavity 35 may be the lower shell 51, or may be integrally formed with the middle grid ribs 32 by injection molding. In this embodiment, the side walls and the bottom wall of the sinking cavity 35 are integrally formed with the middle grid ribs 32 by injection molding. An opening of the sinking cavity 35 is provided with an annular boss 36, and the sinking cavity 35 is connected with the side walls of the middle shell 31 and/or the middle grid ribs 32 through the annular boss 36. This setting mode can ensure that the connection between the sinking cavity 35 and the middle shell 31 and/or the middle grid ribs 32 is far away from the welded joint, and further avoid the mutual seepage of the urea liquid and the fuel from the welded joint.

Specifically, the sinking cavity 35 is located on the diagonal of the second middle grid cavity group to further ensure the uniform gravity distribution of the tank body.

Specifically, the lower grid cavities include a second lower grid cavity 55 group aligned with the second middle grid cavity group. In the second lower grid cavity 55 group, except for a second lower grid cavity 55 corresponding to the sinking cavity 35, the other second lower grid cavities 55 all communicate with the first lower grid cavity 54 group, so as to make the fuel circulate between the second lower grid cavities 55 and the first lower grid cavity 54 group.

Embodiment 4

The integrated fuel tank and urea tank is formed by performing injection molding on the upper shell 11, the middle shell 31 and the lower shell 51 separately, and then welding the upper shell 11, the middle shell 31 and the lower shell 51 in turn. The material of the integrated fuel tank and urea tank may be any oil-resistant material that meets the strength requirements, such as resin, specifically such as impermeable polyamide, polyethylene, polystyrene, etc.

This embodiment provides a manufacturing process for manufacturing a grid-shaped fuel tank or an integrated fuel tank, wherein the grid-shaped fuel tank or integrated fuel tank is the grid-shaped fuel tank in the embodiment 1 or the integrated fuel tank in the embodiment 2. The manufacturing process includes the following steps:

(1) Melting of raw materials, wherein the raw materials including nylon and polyethylene can be added with auxiliary additives such as a compatibilizer, a toughening agent and an antioxidant, the compatibilizer may be maleic anhydride graft, and the toughening agent may be POE.

(2) Manufacturing of the upper shell 11, the middle shell 31 and the lower shell 51 by injection molding, wherein the injection molding adopts a high-precision servo injection molding machine, an injection pressure, an injection speed and a molding temperature are controlled according to melting points of the materials, the injection pressure is ≤90 Mpa, the molding temperature is greater than the melting points of the raw materials and less than 280° C., pressure holding time is greater than 5 s, and cooling time is greater than 30 s.

(3) Welding, wherein the upper shell 11, the middle shell 31 and the lower shell 51 are connected by welding to form a shell, the welding adopts infrared welding, and a hot melting depth is not less than 0.8 mm, a welding temperature is not less than 270° C., hot melting time is not less than 50 s, and curing time is not less than 20 s.

The shell material selected in this embodiment can ensure that the upper shell 11, the middle shell 31 and the lower shell 51 have excellent mechanical properties, heat resistance and wear resistance, and excellent low-temperature impact resistance, so as to ensure that the product will not leak when being collided in cold areas; through the injection molding and welding process, the thicknesses of the upper shell 11, the middle shell 31, the lower shell 51, the upper grid ribs 13, the middle grid ribs 32 and the lower grid ribs 52 are uniform, and the connection strength at the welded joint is large enough, to manufacture the upper shell 11, the middle shell 31 and the lower shell 51 with strong deformation resistance.

All embodiments in the description are described progressively, the same and similar parts between the various embodiments can be referred to each other, and each embodiment focuses on the differences from other embodiments. In particular, as the system embodiment is substantially similar to the method embodiment, the description is relatively simple, and for related parts, please refer to the part of description of the method embodiment.

The above is merely the embodiments of the present application and is not used to limit the present application. For those skilled in the art, various modifications and changes can be made to the present application. Any modification, equivalent replacement, improvement, etc., made within the spirit and principle of the present application shall be included in the scope of the claims of the present application.

What is claimed:

1. A grid-shaped fuel tank, comprising:
   a fuel tank shell, wherein the fuel tank shell encloses a cavity comprising a fuel cavity, and the fuel tank shell comprises an upper shell part, a middle shell part and a lower shell part;
   the middle shell part is provided with a middle grid rib structure, the middle grid rib structure partitions a middle portion of the cavity into a plurality of middle grid cavities, the middle grid cavities do not communicate in a horizontal direction, and a bottom end of a first middle grid cavity group comprised in the middle grid cavities is provided with fuel passing ports for mutual communication to form the fuel cavity;
   the first middle grid cavity group is an integrated structure.

2. The grid-shaped fuel tank according to claim 1, wherein an inlet is formed in a top end of at least one of first middle grid cavities in the first middle grid cavity group, the inlet is connected with a fuel inlet formed in the fuel tank shell, and openings are formed in bottom ends of the first middle grid cavities to communicate with each other to form the fuel cavity; and
   the middle grid rib structure is of a grid shape formed by the arrangement and connection of a plurality of middle diaphragms, and the first middle grid cavity group is of a sealed channel structure with openings in two ends.

3. The grid-shaped fuel tank according to claim 2, wherein the cavity is internally further provided with a lower grid rib structure corresponding to the lower shell area, and the lower grid rib structure is aligned with the middle grid rib structure to be in sealed connection;
   the lower grid rib structure partitions a lower portion of the cavity into a plurality of lower grid cavities, the lower grid cavities comprise a first lower grid cavity group aligned with the first middle grid cavity group, and the first middle grid cavities in the first middle grid cavity group communicate with the first lower grid cavities in the first lower grid cavity group through the fuel passing ports; and
   fuel flow ports formed in lower grid ribs between the first lower grid cavities are in communication, and the first middle grid cavity group and the first lower grid cavity group form the fuel cavity.

4. The grid-shaped fuel tank according to claim 3, wherein the lower shell area comprises a side wall and a bottom wall, and the fuel flow ports extend upward from the connection between the lower grid ribs and the bottom wall.

5. An integrated fuel tank, comprising the grid-shaped fuel tank according to claim 2, the middle grid cavities further comprise a second middle grid cavity group, the first middle grid cavity group and the second middle grid cavity group do not communicate with each other, and middle grid cavities in the second middle grid cavity group communicate with each other to form a urea cavity.

6. The integrated fuel tank according to claim 5, wherein bottom ends of the second middle grid cavities in the second middle grid cavity group are sealed, and side walls of the second middle grid cavities communicate with each other to form the urea cavity.

7. The grid-shaped fuel tank according to claim 1, wherein the lower shell part is provided with a lower grid rib structure corresponding to the lower shell area, and the lower grid rib structure is aligned with the middle grid rib structure to be in sealed connection;
   the lower grid rib structure partitions a lower portion of the cavity into a plurality of lower grid cavities, the lower grid cavities comprise a first lower grid cavity group aligned with the first middle grid cavity group, and the first middle grid cavities in the first middle grid cavity group communicate with the first lower grid cavities in the first lower grid cavity group through the fuel passing ports; and fuel flow ports formed in lower grid ribs between the first lower grid cavities are in communication, and the first middle grid cavity group and the first lower grid cavity group form the fuel cavity.

8. The grid-shaped fuel tank according to claim 7, wherein the lower shell part comprises a side wall and a bottom wall, and the fuel flow ports extend upward from the connection between the lower grid ribs and the bottom wall.

9. The grid-shaped fuel tank according to claim 1, wherein a cross section of the middle grid cavity is in a shape selected from at least one of a triangle, a quadrangle, a circle, a pentagon, a hexagon and a polygon.

10. The grid-shaped fuel tank according to claim 9, wherein the fuel tank is a cube, middle grid ribs comprises a plurality of middle diaphragms extending along an vertical direction of the fuel tank, and the cross section of the middle grid cavity is a right-angled quadrangle.

11. An integrated fuel tank, comprising the grid-shaped fuel tank according to claim 1,
the middle grid cavities further comprise a second middle grid cavity group, the first middle grid cavity group and the second middle grid cavity group do not communicate with each other, and middle grid cavities in the second middle grid cavity group communicate with each other to form a urea cavity.

12. The integrated fuel tank according to claim 11, wherein bottom ends of the second middle grid cavities in the second middle grid cavity group are sealed, and side walls of the second middle grid cavities communicate with each other to form the urea cavity.

* * * * *